(12) United States Patent
Kwon et al.

(10) Patent No.: US 11,509,004 B2
(45) Date of Patent: Nov. 22, 2022

(54) BATTERY MODULE

(71) Applicant: LG CHEM, LTD., Seoul (KR)

(72) Inventors: Dong Keun Kwon, Daejeon (KR); Yee Gahng Song, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 193 days.

(21) Appl. No.: 16/763,514

(22) PCT Filed: Jan. 7, 2019

(86) PCT No.: PCT/KR2019/000228
§ 371 (c)(1),
(2) Date: May 12, 2020

(87) PCT Pub. No.: WO2019/139316
PCT Pub. Date: Jul. 18, 2019

(65) Prior Publication Data
US 2020/0328486 A1    Oct. 15, 2020

(30) Foreign Application Priority Data
Jan. 9, 2018 (KR) .................. 10-2018-0002910

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/647* (2015.04); *H01M 50/20* (2021.01)

(58) Field of Classification Search
CPC ........... H01M 10/6556; H01M 10/613; H01M 10/647; H01M 50/20; H01M 10/0481;
(Continued)

(56) References Cited

U.S. PATENT DOCUMENTS

2001/0030069 A1* 10/2001 Misu ................ B60N 2/012
903/952
2004/0070366 A1* 4/2004 Takeshita ............ H01M 50/51
320/107
(Continued)

FOREIGN PATENT DOCUMENTS

CN          103403915 A  * 11/2013 .......... H01M 10/613
CN          106602175 A    4/2017
(Continued)

OTHER PUBLICATIONS

International Search Report for PCT/KR2019/000228 (PCT/ISA/210) dated Apr. 22, 2019.
(Continued)

*Primary Examiner* — Kaity V Chandler
(74) *Attorney, Agent, or Firm* — Birch, Stewart, Kolasch & Birch, LLP

(57) ABSTRACT

The present disclosure relates to a battery module that has a filling portion transformed into a structure in which a battery cell is supported such that swelling pressure generated when swelling occurs is offset without an additional control, or a structure in which the battery cell is efficiently cooled.

8 Claims, 4 Drawing Sheets

(51) Int. Cl.
H01M 10/647 (2014.01)
H01M 50/20 (2021.01)

(58) Field of Classification Search
CPC .......... H01M 10/615; H01M 10/6557; H01M 10/6563; H01M 10/655; H01M 10/6555; H01M 50/24; H01M 10/659; Y02P 70/50; Y02E 60/10

See application file for complete search history.

(56) References Cited

U.S. PATENT DOCUMENTS

| | | | |
|---|---|---|---|
| 2008/0299453 A1* | 12/2008 | Shinyashiki | H01M 6/46 429/152 |
| 2009/0053585 A1* | 2/2009 | Nakazawa | H01M 10/0481 429/120 |
| 2009/0061299 A1* | 3/2009 | Uchida | H01M 50/209 429/156 |
| 2011/0206948 A1* | 8/2011 | Asai | H01M 50/20 429/7 |
| 2012/0028107 A1* | 2/2012 | Sugita | H01M 10/6555 429/156 |
| 2012/0214038 A1* | 8/2012 | Kim | H01M 50/211 429/99 |
| 2013/0146249 A1* | 6/2013 | Katayama | H01M 10/613 165/46 |
| 2013/0209858 A1 | 8/2013 | Schmitt et al. | |
| 2014/0014418 A1* | 1/2014 | Komaki | H01M 10/647 429/143 |
| 2014/0014420 A1* | 1/2014 | Nakamura | H01M 50/20 180/65.1 |
| 2014/0134462 A1 | 5/2014 | Choi et al. | |
| 2014/0377633 A1* | 12/2014 | Kong | H01M 50/578 429/186 |
| 2015/0086817 A1 | 3/2015 | Chung et al. | |
| 2015/0188203 A1* | 7/2015 | Enomoto | H01M 10/6567 429/83 |
| 2015/0311572 A1 | 10/2015 | Sung et al. | |
| 2016/0093849 A1* | 3/2016 | DeKeuster | H01M 10/0525 429/61 |
| 2017/0133706 A1* | 5/2017 | Ejima | H01M 50/20 |
| 2018/0205118 A1* | 7/2018 | Chu | H01M 10/0418 |
| 2018/0358592 A1* | 12/2018 | Park | C08K 5/0066 |
| 2019/0299812 A1* | 10/2019 | Du | H01M 10/6567 |

FOREIGN PATENT DOCUMENTS

| | | | | |
|---|---|---|---|---|
| CN | 104425792 B | * | 9/2018 | .......... G01R 31/364 |
| EP | 3 190 642 A1 | | 7/2017 | |
| JP | 2008-300103 A | | 12/2008 | |
| JP | 2011-96465 A | | 5/2011 | |
| JP | 2011-115040 A | | 6/2011 | |
| JP | 5386917 B2 | | 1/2014 | |
| JP | 2014-192094 A | | 10/2014 | |
| JP | 2014-212032 A | | 11/2014 | |
| JP | 2015-50186 A | | 3/2015 | |
| KR | 10-2012-0129968 A | | 11/2012 | |
| KR | 10-2013-0064704 A | | 6/2013 | |
| KR | 10-1340365 B1 | | 12/2013 | |
| KR | 10-2014-0087124 A | | 7/2014 | |
| KR | 10-2014-0121704 A | | 10/2014 | |
| KR | 10-2014-0130859 A | | 11/2014 | |
| KR | 10-1469518 B1 | | 12/2014 | |
| KR | 10-2015-0034500 A | | 4/2015 | |
| KR | 10-2017-0095604 A | | 8/2017 | |
| KR | 10-1785536 B1 | | 10/2017 | |
| WO | WO 2017/150939 A2 | | 9/2017 | |
| WO | WO-2018099396 A1 | * | 6/2018 | .......... H01M 10/613 |

OTHER PUBLICATIONS

First Office Action for European Patent Application No. 19738430.8 dated Nov. 26, 2021.
Partial supplementary European Search Report for European Patent Application No. 19738430.8 dated Oct. 7, 2020.

* cited by examiner

[Fig. 1]
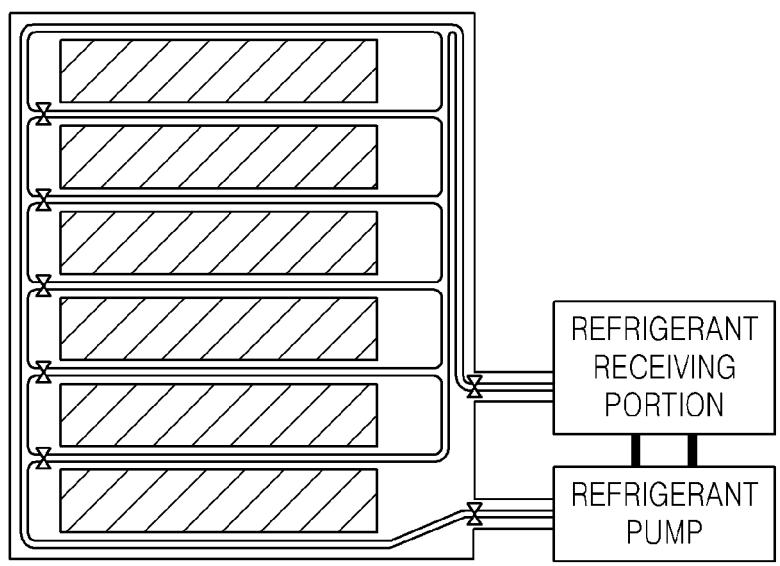
[Fig. 2]
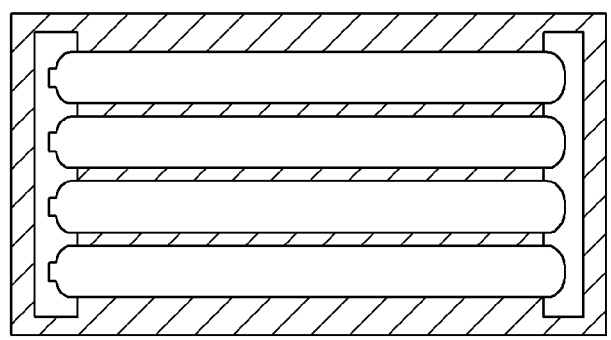

[Fig. 3]
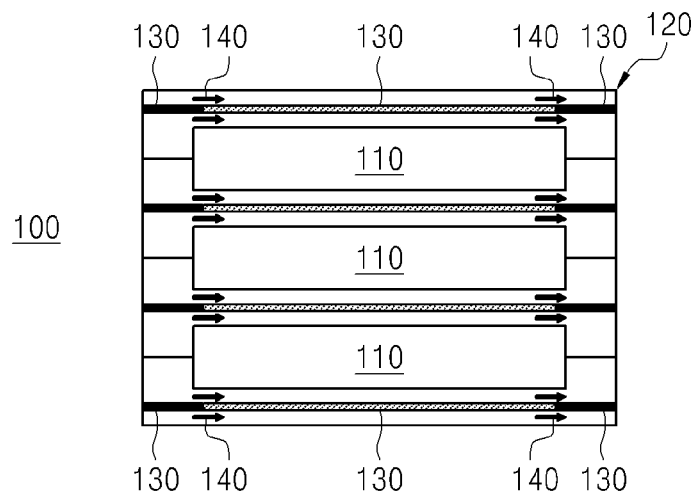
[Fig. 4]
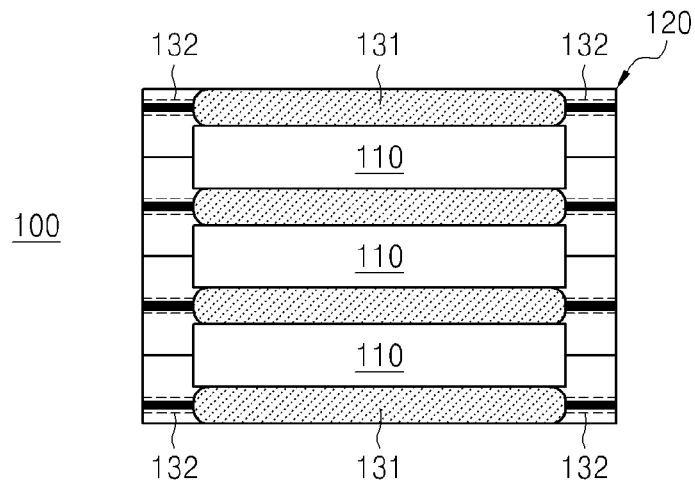
[Fig. 5]
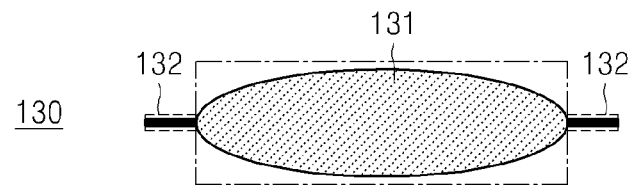

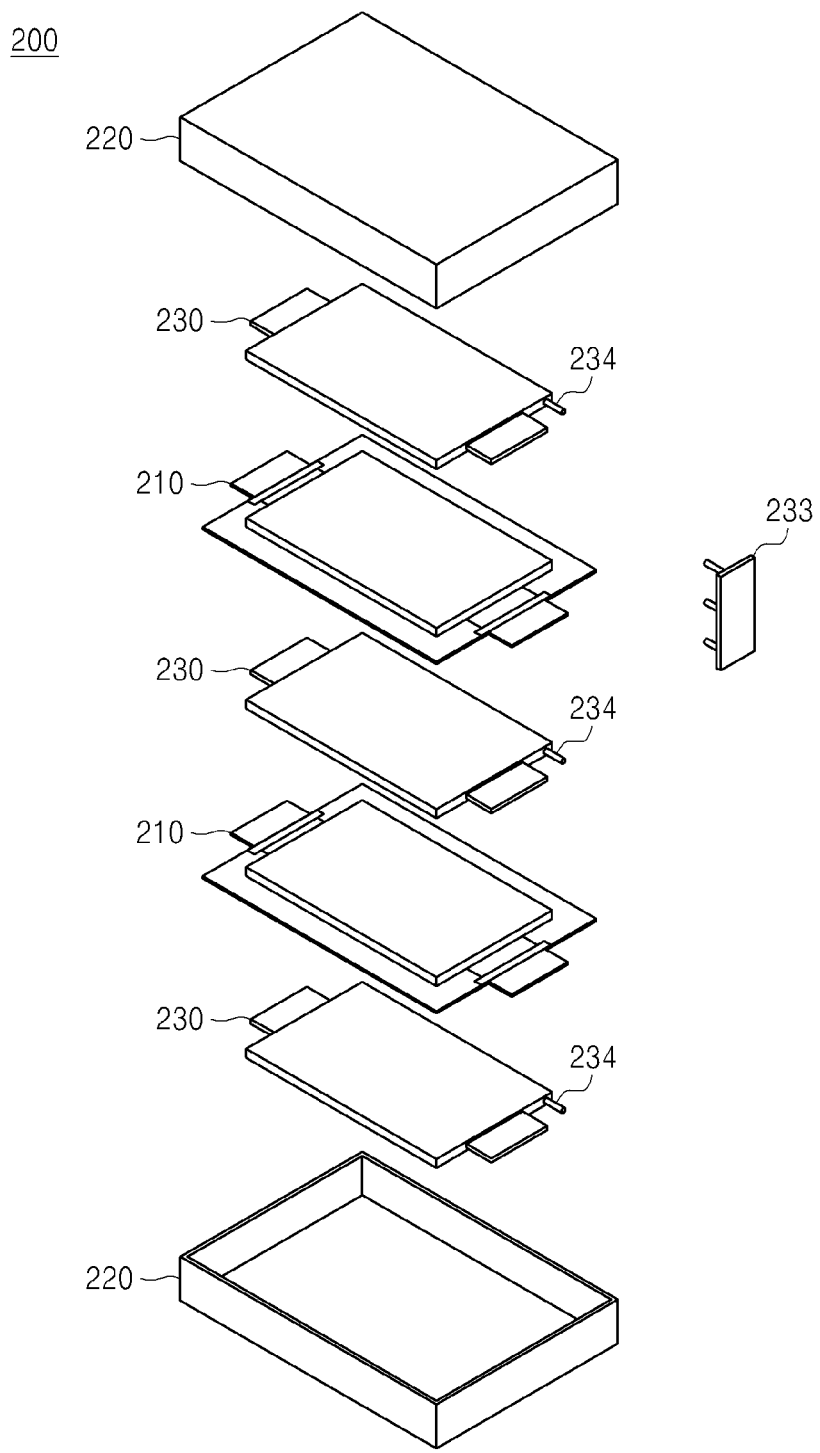
[Fig. 6]

[Fig. 7]
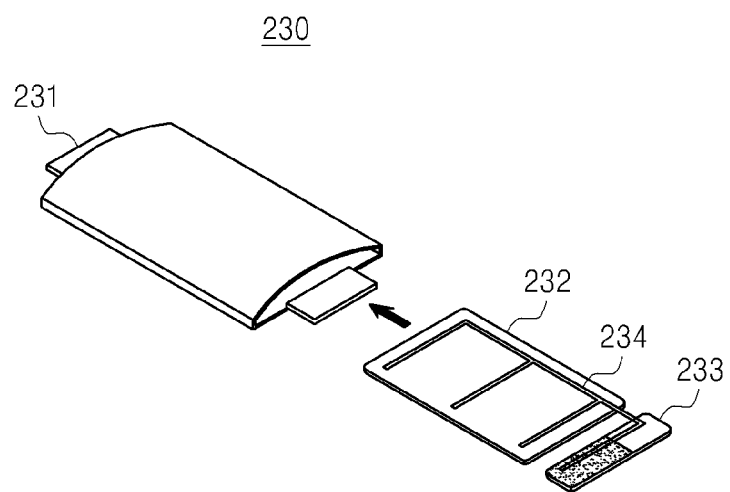

BATTERY MODULE

TECHNICAL FIELD

The present disclosure relates to a battery module, and more particularly, to a battery module that has a filling portion transformed into a structure in which a battery cell is supported such that swelling pressure generated when swelling occurs according to temperatures is offset without an additional control, or a structure in which the battery cell is efficiently cooled.

BACKGROUND ART

A rapid increase in use of fossil fuel increases a demand for use of alternative or clean energy. As part of the demand, the most actively studied fields is a power generation and storage field using electrochemistry.

At present, a typical example of an electrochemical device using such electrochemical energy is a battery, and the application area tends to be gradually increasing.

In recent days, as the technology development and demand for portable devices, such as a portable computer, a mobile phone, and a camera, has increased, the demand for a battery as an energy source rapidly rises so that a lithium battery having a long lifecycle and a low self-discharge rate has been commercialized and widely used. Much research thereon has been conducted.

In particular, a pouch-type battery can be changed into various types of structures to meet customer needs, thereby having improved product application and being advantageous for small quantity batch production when compared to a battery in which a metal can-type battery case is used.

Meanwhile, a battery cell is swollen by a swelling phenomenon caused by decomposition or side reaction of the electrolyte when the battery cell is stored at high temperatures for a long time, or an abnormality, such as overcharge, overdischarge, or an internal short circuit due to a failure in a charger or a front control circuit, occurs.

Such a swelling phenomenon increases the volume of a pouch exterior material, and weakens the adhesion of a sealing area of the pouch exterior material to leak the electrolyte through the sealing area of the pouch exterior material or cause acceleration of the side reaction of the electrolyte to place the inside of the pouch exterior material in a high-temperature and high-pressure environment, thereby igniting or exploding the battery cell.

In addition, when the battery is left at high temperatures, the decomposition or side reaction of the electrolyte is promoted at high temperatures to promote the swelling phenomenon.

In more detail, when the internal temperature of the battery rises, the electrolyte is decomposed more actively, or an additional side reaction thereof is made so that a gas, such carbon dioxide or carbon monoxide, is generated in a large amount, thereby increasing the thickness of the battery cell more quickly at low temperatures.

To reduce such a swelling phenomenon, conventional battery modules have alternatives as in FIGS. 1 and 2.

FIG. 1 is a structural view of a conventional battery module, and FIG. 2 is a structural view of another conventional battery module.

The conventional battery module of FIG. 1 has a structure for circulating a refrigerant between battery cells and performs a method of reducing the temperature of the battery cells to curb a swelling phenomenon that is accelerated at high temperatures.

A refrigerant circulating structure of FIG. 1 allows the refrigerant to pass through a refrigerant tube that is formed outside of the battery cells when a refrigerant receiving portion having received the refrigerant transfers the refrigerant.

Then, the refrigerant having passed through the tube is collected in a refrigerant pump and transferred to the refrigerant receiving portion such that the refrigerant is rereceived therein.

The method as described above has an advantage of quickly reducing the temperature of the battery cells by directly lowering the temperature of the battery cells through the refrigerant, but cannot deal with an issue that a swelling phenomenon occurs at low temperatures.

Meanwhile, the conventional battery module of FIG. 2 has a structure in which a partition between battery cells is formed so that the battery cells are coupled by being inserted into a case, and performs a method of delaying a swelling phenomenon by allowing the partition to offset pressure that increases within the battery cells in the swelling phenomenon.

However, the structure as described above has an issue that, since the large surfaces of the battery cells are not exposed externally, it is difficult to form a cooling passage for cooling the respective battery cells.

Thus, it is required an alternative for curbing or reducing a swelling phenomenon more efficiently, as well as a method of curbing a swelling phenomenon according to the temperature of a battery cell.

RELATED ART DOCUMENT

Korean Patent Registration No. 10-1340365

DISCLOSURE OF THE INVENTION

Technical Problem

The present disclosure provides a battery module that has a configuration for easily reducing the temperature of a battery cell and offsetting swelling pressure generated in a swelling phenomenon.

Technical Solution

In accordance with an exemplary embodiment, a battery module includes: a plurality of battery cells; a module case configured to receive the plurality of battery cells; and filling portions provided between the module case and the plurality of battery cells and between the plurality of battery cells.

When an internal temperature of the battery module is lower than a predetermined temperature value, the filling portions may transform into a structure in which the volume of the filling portions is increased such that the plurality of battery cells are supported to prevent the plurality of battery cells from being swollen, and when the internal temperature of the battery module is higher than or equal to the predetermined temperature value, the filling portions may transform into a structure in which the volume of the filling portions is decreased such that cooling passages are secured between the module case and the plurality of battery cells and between the plurality of battery cells.

The filling portions may be formed of a shape transformation material that changes shape according to a temperature of the filling portions.

Each of the filling portions may include: a filling portion body having an upper body and a lower body of a plate shape individually formed thereon, the filling portion body having a first end and a second end; and a pair of filling portion fixing portions, each filling portion fixing portion being positioned on a respective one of the first end and the second end of the filling portion body and being attached to inside of the module case such that the filling portion body is fixed.

Each filling portion body is configured to: when the internal temperature of the battery module is lower than the predetermined of temperature value, transform into a first shape in which the upper body and the lower body are respectively bent in a direction in which the plurality of battery cells are disposed, and when the internal temperature of the battery module is higher than or equal to the predetermined temperature value, transform into a second shape in which the upper body and the lower body are respectively stretched in parallel.

The filling portion fixing portions may be formed of an elastic member.

The cooling passages may be air passages that are formed in empty spaces between the filling portions and the plurality of battery cells.

In accordance with another exemplary embodiment, a battery module includes: a plurality of battery cells; a module case configured to receive the plurality of battery cells; and filling portions provided between the module case and the plurality of battery cells and between the plurality of battery cells, wherein the filling portions are configured to transform into a structure in which the volume of the filling portions is increased over time such that the plurality of battery cells are supported to prevent the plurality of battery cells from being swollen.

Each of the filling portions may include: a filling portion cover forming an outer surface of the filling portion; a compressible expansion member provided within the filling portion cover, and configured to increase its volume by receiving a solution; and a solution storage portion connected to the compressible expansion member to store the solution to be supplied to the compressible expansion member.

Each of the filling portions may further include a solution transfer member provided in one shape on an inside of the compressible expansion member and the solution storage portion to transfer the solution from the solution storage portion to the compressible expansion member.

The plurality of battery cells may be pouch-type battery cells.

A high-capacity battery pack including, as a unit module, a battery module in accordance with an exemplary embodiment is formed and applicable to various devices.

Advantageous Effects

A battery module, in accordance with an embodiment, facilitates cooling of a battery cell at high temperatures and supports the battery cell at low temperatures to curb or reduce a swelling phenomenon, thereby being capable of being driven efficiently and safely.

BRIEF DESCRIPTION OF THE DRAWINGS

FIG. 1 is a structural view of a conventional battery pack.

FIG. 2 is a structural view of another conventional battery pack.

FIG. 3 is a structural view of a lateral surface of a battery module that includes filling portions with a volume reduced in a high-temperature state in accordance with an exemplary embodiment.

FIG. 4 is a structural view of the lateral surface of the battery module that includes the filling portions with a volume increased in a low-temperature state in accordance with an exemplary embodiment.

FIG. 5 is a detailed side view of the filling portion with a volume increased in the low-temperature state in accordance with an exemplary embodiment.

FIG. 6 is a perspective view of a battery module in accordance with another exemplary embodiment.

FIG. 7 is a detailed perspective view of a filling portion of the battery module in accordance with another exemplary embodiment.

MODE FOR CARRYING OUT THE INVENTION

Hereinafter, embodiments of the present invention will be described in detail with reference to the accompanying drawings. The present invention should not be construed as limited to the embodiments set forth herein. Rather, these embodiments are provided so that this disclosure will be thorough and complete, and will fully convey the scope of the present invention to those skilled in the art.

Although the terms encompassing ordinal numbers such as first, second, etc. may be used to describe various elements, these elements are not limited by these terms. The terms are only used for the purpose of distinguishing one element from another. For example, a first element could be termed a second element, and, similarly, a second element could be termed the first element without departing from the scope of the present invention. The terminology provided herein is merely used for the purpose of describing particular embodiments, and is not intended to be limiting of embodiments of the present invention. The singular forms "a," "an" and "the" are intended to include the plural forms as well, unless the context clearly indicates otherwise.

Although the terms used in the present invention are selected from generally known and used terms, the terms may be varied depending on the intention or customs of a person skilled in the art, the appearance of new technology, or the like. In addition, some of the terms mentioned in the description of the present invention have been selected by the applicant at his or her discretion. In this case, the detailed meanings thereof are described in relevant parts of the description herein. Furthermore, it is required that the present invention is understood, not simply by the actual terms used but by the meanings of each term lying within.

Embodiment 1

Hereinafter, a battery module in accordance with an embodiment of the present disclosure will be described.

The battery module, according to the embodiment of the present disclosure, is formed as a structure in which the shape of a filling portion, which is disposed between battery cells to curb or reduce a swelling phenomenon that is accelerated at high temperatures, is transformed itself according to temperatures, so as to be able to protect the battery cells without an additional control, thereby being capable of being driven safely and efficiently.

FIG. 3 is a structural view of a lateral surface of a battery module that includes filling portions with a volume reduced in a high-temperature state in accordance with an exemplary embodiment.

FIG. 4 is a structural view of the lateral surface of the battery module that includes the filling portions with a volume increased in a low-temperature state in accordance with an exemplary embodiment.

Referring to FIGS. 3 and 4, a battery module 100 in accordance with an embodiment includes a plurality of battery cells 110, a module case 120 having the plurality of battery cells 110 mounted thereon, filling portions 130 provided between the module case 120 and the battery cells 110 and between the plurality of battery cells 110, and cooling passages 140 formed between the filling portions and the battery cells.

Such a configuration of the battery module 100 will be described in more detail below.

The module case 120 receives the plurality of battery cells, and may also allow the filling portions 130 to be received thereinside.

Further, the module case 120 may be manufactured of various materials and in various shapes according to the configuration of a device or a battery pack for mounting the battery module 100.

Further, the battery cells 110 are formed in a plurality in a pouch shape, and generally have a structure in which a plurality of anode electrodes (aluminum foil) and cathode electrodes (copper foil) are stacked with a separator interposed therebetween, or the separator is interposed between the anode electrode and the cathode electrode, the anode electrode and the cathode electrode are rolled, an anode tab is welded to the anode electrode, a cathode tab is welded to the cathode electrode, and the anode electrode and the cathode electrode are sealed by being covered by an aluminum pouch.

Meanwhile, the battery cells 110 are swollen by a swelling phenomenon caused by decomposition or side reaction of an electrolyte when the battery cells are stored at high temperatures for a long time, or an abnormality, such as overcharge, overdischarge, or an internal short circuit due to a failure in a charger or a front control circuit, occurs.

The swelling phenomenon may cause ignition or explosion as generation of a gas, such as carbon dioxide or carbon monoxide, upon the decomposition or side reaction of the electrolyte allows the thickness of the battery cells to be increased.

Further, the swelling phenomenon is promoted at high temperatures, and a method of curbing or reducing such decomposition and/or side reaction of an electrolyte is to reduce the temperature of the battery cells.

To reduce the temperature of the battery cells as described above, the battery cells need to be exposed to the air such that the air may flow to surfaces of the battery cells.

Further, when the swelling phenomenon has occurred, it is required to offset swelling pressure to expand outward from the insides of the battery cells in order to delay the swelling phenomenon.

To offset the swelling pressure as described above, the battery cells need to be supported through an external structure.

Such an issue may be easily solved through the filling portions 130, which will be described in more detail below.

Further, the filling portions 130 are transformed into a shape in which the volume of the filling portions 130 is increased such that the respective battery cells are supported to prevent the battery cells from being swollen when the temperature of the plurality of battery cells 110 is lower than a predetermined temperature value, and are transformed into a shape in which the volume of the filling portions 130 is decreased such that the cooling passages 140 are secured between the module case and the battery cells and between the plurality of battery cells when the temperature of the plurality of battery cells 110 is higher than or equal to the predetermined temperature value.

In this case, the predetermined temperature value is set to, for example, approximately 30° C. to be maintained below approximately 45° C., which is an optimum driving temperature, but the predetermined temperature value is not limited thereto.

Further, the filling portions 130 may be formed of a shape transformation material with a shape that changes according to temperatures, and one among bimetal, a shape memory alloy, a shape memory resin, or a temperature sensing resin may be used as the shape transformation material.

In this case, the filling portions 130 is formed of, for example, a shape memory alloy, but are not limited thereto.

The shape memory alloy stands for a ferromagnetic alloy that remembers a predetermined shape and that even when deformed by an external force, returns to an original shape thereof at a predetermined temperature. The shape memory alloy is selected from the group consisting of TiNi, NiAl, CuZn, FeNiTiCo, TiNb, MnCu, and FeCrNi, and TiNi may be used as the shape memory alloy.

Further, the shape memory alloy consists of a one-way shape memory alloy having a one-way shape memory characteristic and a two-way shape memory alloy having a two-way shape memory characteristic. In the present disclosure, the shape needs to be transformed into two forms in which the shape memory alloy is contracted at higher than or equal to the predetermined temperature value and expanded at lower than the predetermined temperature value. Thus, a two-way shape memory alloy may be used as the shape memory alloy.

Such a configuration of the filling portions will be described in more detail with reference to FIG. 5.

FIG. 5 is a detailed side view of the filling portion with a volume increased in the low-temperature state in accordance with an exemplary embodiment.

Referring to FIG. 5, the filling portion 130 includes a filling portion body 131 having an upper body and a lower body of a plate-like shape individually formed thereon, and a pair of filling portion fixing portions 132 positioned on both ends of the filling portion body to be attached to the inside of the module case such that the filling portion body is fixed.

Further, the filling portion fixing portions 132 are formed of an elastic member such that the shape of the filling portion body 131 may be easily changed.

For example, when the volume of the filling portion body 131 is increased, the length of the filling portion fixing portions 132 is extended by a predetermined range, and, when the volume of the filling portion body 131 is decreased, the length of the filling portion fixing portions 132 returns to an original one thereof.

In this case, the elastic member is formed as, for example, a spring, but is not limited thereto.

Further, the filling portion body 131 may be formed as two forms by using the two-way shape memory alloy, which will be described in more detail with reference to FIGS. 3 to 5.

One form of the filling portion body 131 is a first form in which the volume of the filling portions 130 of the battery module is increased as in FIG. 4. The first form is formed as a shape in which the upper body and the lower body of the filling portion body 131 are respectively bent in a direction in which the battery cells are disposed when an internal temperature of the battery module is lower than a predetermined range of temperature values.

The shape, in which the filling portion body 131 is bent, is formed as a floor as in FIG. 5, but formed as a shape in which, as a large surface of each of the battery cells and the floor of the filling portion body 131 come into contact with each other, the filling portion body 131 is pressed.

Further, the contact between the filling portion body 131 and the battery cell 110 may allow the swelling pressure, which is generated inside the battery cell when swelling occurs, to be offset.

Further, the shape transformation material of the filling portion body 131 has a value set to allow the shape thereof to be changed into a bent form when the internal temperature of the battery module is approximately 29° C. in accordance with an embodiment.

The other form is a second form in which the volume of the filling portions of the battery module is decreased as in FIG. 3. The second form is formed as a shape in which the upper body and the lower body are respectively stretched in parallel when the internal temperature of the battery module is higher than or equal to the predetermined range of temperature values.

This may reduce the temperature of the respective battery cells to curb the swelling phenomenon that is accelerated when the internal temperature of the battery module is high.

In more detail, to reduce the temperature of the battery cell, the large surface of the battery cell is exposed to the air such that heat is transferred to the air around the battery cell.

However, it is difficult to expose, to the air, the large surface of the battery cell that is in contact with the filling portion body 131 through the first form of FIG. 4. Thus, the shape of the filling portion body 131 is transformed into the second form of FIG. 3 such that predetermined gaps may be formed between the battery cells 110 and the filling portions 130.

Such predetermined gaps form the cooling passages 140 to cool the battery cells.

Further, the shape transformation material of the filling portion body 131 has a value set to allow the shape thereof to be changed into a parallelly stretched form when the internal temperature of the battery module is approximately 30° C. in accordance with an embodiment.

In more detail, the cooling passages 140 are formed between the filling portions 130 and the battery cells 110, and stand for air passages that are formed in empty spaces between the filling portions 130 and the battery cells 110.

For example, when the temperature of the battery module is low, the volume of the filling portions 130 is expanded to reduce spaces of the cooling passages 140, or the battery cells 110 and the filling portions 130 are in contact with each other, so that the cooling passages 140 are not formed.

However, when the temperature of the battery module is high, the volume of the filling portions 130 is reduced, empty spaces are formed by the reduced volume of the filling portions 130, so that the cooling passages 140, through which the air may flow, may be formed.

Embodiment 2

Hereinafter, a battery module in accordance with another embodiment of the present disclosure will be described.

The battery module, in accordance with the other embodiment of the present disclosure, is formed as a structure in which a battery cell is supported according to a swelling probability that increases over a driving time of the battery module to form a cooling passage instead of an inefficient swelling suppression structure at the beginning of battery module driving, thereby being capable of being driven safely and efficiently.

FIG. 6 is a perspective view of a battery module in accordance with another exemplary embodiment.

Referring to FIG. 6, a battery module 200 in accordance with another embodiment includes a plurality of battery cells 210, a module case 220 having the plurality of battery cells received therein, and filling portions 230 provided between the module case 220 and the battery cells 210 and between the plurality of battery cells 210.

Such a configuration of the battery module 200 will be described in more detail below.

The module case 220 receives the plurality of battery cells, and may also allow the filling portions 230 to be received thereinside.

Further, the module case 220 may be manufactured of various materials and in various shapes according to the configuration of a device or a battery pack for mounting the battery module 200.

Further, the battery cells 210 are formed in a plurality in a pouch shape, and generally have a structure in which a plurality of anode electrodes (aluminum foil) and cathode electrodes (copper foil) are stacked with a separator interposed therebetween, or the separator is interposed between the anode electrode and the cathode electrode, the anode electrode and the cathode electrode are rolled, an anode tab is welded to the anode electrode, a cathode tab is welded to the cathode electrode, and the anode electrode and the cathode electrode are sealed by being covered by an aluminum pouch.

Meanwhile, the battery cells 210 are swollen by a swelling phenomenon caused by decomposition or side reaction of an electrolyte when the battery cells are stored at high temperatures for a long time or an abnormality, such as overcharge, overdischarge, or an internal short circuit due to a failure in a charger or a front control circuit, occurs.

The swelling phenomenon may cause ignition or explosion as generation of a gas, such as carbon dioxide or carbon monoxide, upon the decomposition or side reaction of the electrolyte allows the thickness of the battery cells to be increased.

When the swelling phenomenon has occurred, it is required to offset swelling pressure to expand outward from the insides of the battery cells in order to delay the swelling phenomenon.

To offset the swelling pressure as described above, the battery cells need to be supported from the outside through an external structure.

Meanwhile, an issue generally occurs in which, as a probability that a swelling phenomenon occurs increases according to a number of times the battery module is drive, an additional structure for offsetting the swelling pressure is not used at the beginning of battery module driving.

Such issues may be easily solved through the filling portions 230, which will be described in more detail with reference to FIG. 7.

FIG. 7 is a detailed perspective view of a filling portion of the battery module in accordance with another exemplary embodiment.

Referring to FIG. 7, the filling portions 230 are transformed into a shape in which the volume of the filling portions is increased over time such that the respective battery cells are supported to prevent the battery cells from being swollen.

Further, the filling portions 230 each include a filling portion cover 231 for forming an outer surface of the filling portion, a compressible expansion member 232 provided within the filling portion cover 231, and having a volume increased by a solution introduced thereinto, and a solution storage portion 233 connected to the compressible expansion member 232 to supply the solution to the inside of the compressible expansion member 232.

Further, the filling portion 230 further includes a solution transfer member 234 that is provided in one shape on the insides of the compressible expansion member 232 and the solution storage portion 233 to transfer the solution from the solution storage portion to the compressible expansion member.

In more detail, the filling portion cover 231 is formed in a contracted state, and may have a volume increased as the compressible expansion member 232 is expanded.

Further, the filling portion cover 231 is formed of a comparatively hard synthetic resin, a thermoplastic resin, or a thermosetting resin to be able to support the battery cells 210 when the volume of the filling portion cover 231 is expanded.

Further, the filling portion cover 231 is formed of an insulating material such that the outer surface of the filling portion is formed in a state of being insulated from the plurality of battery cells, thereby allowing the battery module to be safely driven.

Further, the compressible expansion member 232 is provided within the filling portion cover 231 to have a volume gradually expanded as the solution is transferred thereto. For example, 100% pure natural rayon is used as the compressible expansion member 232. However, the compressible expansion member 232 is not limited thereto, and is formed in a completely dried state.

Further, since a supporting force of the filling portion 230 is adjusted according to an amount of the compressible expansion member 232, a proper amount of the compressible expansion member 232 needs to be provided according to the swelling pressure of the battery cells.

Further, the solution storage portion 233 is connected to the compressible expansion member 232 to store the solution to be supplied to the compressible expansion member 232, and the solution storage portion 233 is formed in, for example, a pouch shape, but is not limited thereto.

Further, the solution storage portion 233 may use various solutions. However, for example, insulating oil stable to oxidation may be used. When the insulating oil is leaked, damage due to the leakage may be minimized.

Further, the solution storage portion 233 has respective areas formed according to the number of compressible expansion members 232 such that the solution is supplied to each of the compressible expansion members 232. In this case, one solution transfer members may be connected to each area, respectively, and a plurality of solution transfer members may also be connected to one area.

Further, the solution transfer member 234 is provided in one shape on the insides of the compressible expansion member 232 and the solution storage portion 233 to transfer the solution from the solution storage portion 233 to the compressible expansion member. For example, the outside of the solution transfer member 234 may be covered by an insulating material, and the inside thereof may have various shapes by using flexible fibers formed of an acrylic material.

Further, as the solution transfer member 234 absorbs the solution through the fibers and transfers the solution to the compressible expansion member 232, a solution transfer rate thereof is low. Thus, the compressible expansion member 232 may be expanded gradually.

Further, the solution transfer rate is adjusted according to the type, number, and thickness of the fibers of the solution transfer member 234, which allows a proper type, number, and thickness of fibers to be provided according to the life of the battery module.

Although the battery module has been described with reference to the specific embodiments, it should be noted that the embodiments are not for limiting the present invention and but for describing the invention. Further, it will be readily understood by those skilled in the art that various modifications and changes can be made within the scope of the technical concept of the present invention.

What is claimed is:

1. A battery module comprising:
a plurality of battery cells;
a module case including the plurality of battery cells; and
filling portions provided between the module case and the plurality of battery cells and between the plurality of battery cells,
wherein the filling portions are configured to:
when an internal temperature of the battery module is lower than a predetermined temperature value, transform into a structure in which the volume of the filling portions is increased such that the plurality of battery cells are supported to prevent the plurality of battery cells from being swollen, and
when the internal temperature of the battery module is higher than or equal to the predetermined temperature value, transform into a structure in which the volume of the filling portions is decreased such that cooling passages are formed between the module case and the plurality of battery cells and between the plurality of battery cells.

2. The battery module of claim 1, wherein the filling portions are formed of a shape transformation material that changes shape according to a temperature of the filling portions.

3. The battery module of claim 2, wherein each of the filling portions comprise:
a filling portion body having an upper body and a lower body of a plate shape individually formed thereon, the filling portion body having a first end and a second end; and
a pair of filling portion fixing portions, each filling portion fixing portion being positioned on a respective one the first end and the second end of the filling portion body and being attached to inside of the module case such that the filling portion body is fixed.

4. The battery module of claim 3, wherein each filling portion body is configured to:
when the internal temperature of the battery module is lower than the predetermined temperature value, transform into a first shape in which the upper body and the lower body are respectively bent in a direction in which the plurality of battery cells are disposed, and
when the internal temperature of the battery module is higher than or equal to the predetermined temperature value, transform into a second shape in which the upper body and the lower body are respectively stretched in parallel.

5. The battery module of claim 3, wherein the filling portion fixing portions are formed of an elastic member.

6. The battery module of claim 1, wherein the formed cooling passages are air passages between the filling portions and the plurality of battery cells.

7. The battery module of claim 1, wherein the plurality of battery cells are pouch-type battery cells.

8. A high-capacity battery pack comprising, as a unit module, a battery module according to claim 1.

* * * * *